(12) United States Patent
Chu

(10) Patent No.: US 9,060,093 B2
(45) Date of Patent: Jun. 16, 2015

(54) MECHANISM FOR FACILITATING ENHANCED VIEWING PERSPECTIVE OF VIDEO IMAGES AT COMPUTING DEVICES

(75) Inventor: Michael M. Chu, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 68 days.

(21) Appl. No.: 13/976,965

(22) PCT Filed: Sep. 30, 2011

(86) PCT No.: PCT/US2011/054401
§ 371 (c)(1),
(2), (4) Date: Jun. 27, 2013

(87) PCT Pub. No.: WO2013/048482
PCT Pub. Date: Apr. 4, 2013

(65) Prior Publication Data
US 2013/0271553 A1    Oct. 17, 2013

(51) Int. Cl.
*H04N 7/14* (2006.01)
*H04N 5/232* (2006.01)
(Continued)

(52) U.S. Cl.
CPC ....... *H04N 7/141* (2013.01); *G09G 2320/0261* (2013.01); *H04N 5/23219* (2013.01); *G06T 15/205* (2013.01); *G06F 3/012* (2013.01); *G06T 7/2033* (2013.01); *G06T 2207/30201* (2013.01)

(58) Field of Classification Search
CPC .. H04N 7/141; H04N 5/23219; G06T 15/205; G06T 7/2033; G06F 3/012
USPC ......... 345/419, 420, 440; 348/14.01, 77, 149, 348/220.1, 240.3, 43, 218.1, 376; 396/178, 396/380; 463/36; 701/23; 707/706; 382/154
See application file for complete search history.

(56) References Cited

U.S. PATENT DOCUMENTS 4,319,817 A * 3/1982 Johnson ........................ 396/178
6,097,393 A * 8/2000 Prouty et al. .................. 345/419
(Continued)

FOREIGN PATENT DOCUMENTS

EP    0874303    10/1998
EP    2075761    7/2009
(Continued)

OTHER PUBLICATIONS

PCT/US2011/054401, Notification of Transmittal of the International Search Report and the Written Opinion of the International Searching Authority, mailed May 23, 2012, 10 pages.
(Continued)

*Primary Examiner* — Gerald Gauthier
(74) *Attorney, Agent, or Firm* — Blakely, Sokoloff, Taylor & Zafman LLP

(57) ABSTRACT

A mechanism is described for facilitating enhanced viewer perception of video images at computing devices according to one embodiment of the invention. A method of embodiments of the invention includes tracking, at a first computing device, movements associated with a first user within a camera range of one or more cameras coupled to the first computing device. Each movement of the first user may trigger an updated view of contents being displayed in real-time on the first computing device. The method may further include calculating a synthesized updated view of the contents in response to tracking a movement of the first user from a first position to a second position. The synthesized updated view may represent a realistic view of the contents in response to the movement of the first user from the first position to the second position. The method may further include displaying the synthesized updated view of the contents.

16 Claims, 5 Drawing Sheets

(51) Int. Cl.
*G06T 15/20* (2011.01)
*G06F 3/01* (2006.01)
*G06T 7/20* (2006.01)

(56) References Cited

U.S. PATENT DOCUMENTS

| | | | |
|---|---|---|---|
| 6,798,406 B1 * | 9/2004 | Jones et al. | 345/419 |
| 7,307,654 B2 * | 12/2007 | Chang | 348/218.1 |
| 7,561,793 B2 * | 7/2009 | Brost | 396/380 |
| 7,583,316 B2 * | 9/2009 | Miyashita et al. | 348/376 |
| 7,883,415 B2 * | 2/2011 | Larsen et al. | 463/36 |
| 8,068,143 B2 * | 11/2011 | Pilu et al. | 348/220.1 |
| 8,214,345 B2 * | 7/2012 | Torres et al. | 707/706 |
| 8,427,480 B2 * | 4/2013 | Chao | 345/440 |
| 8,462,198 B2 * | 6/2013 | Lin et al. | 348/43 |
| 8,488,870 B2 * | 7/2013 | Martinez-Bauza et al. | 382/154 |
| 8,660,734 B2 * | 2/2014 | Zhu et al. | 701/23 |
| 2002/0060691 A1 | 5/2002 | Broemmelsiek | |
| 2004/0075735 A1 | 4/2004 | Marmaropoulos | |
| 2005/0059488 A1 | 3/2005 | Larsen et al. | |
| 2008/0086451 A1 * | 4/2008 | Torres et al. | 707/3 |
| 2009/0262187 A1 * | 10/2009 | Asada et al. | 348/77 |
| 2009/0313584 A1 | 12/2009 | Kerr et al. | |
| 2010/0125816 A1 | 5/2010 | Bezos | |
| 2010/0156907 A1 | 6/2010 | Vanderspek et al. | |
| 2010/0295958 A1 | 11/2010 | Larsson et al. | |
| 2011/0109771 A1 * | 5/2011 | Onomura | 348/240.3 |
| 2011/0304618 A1 * | 12/2011 | Chen et al. | 345/420 |
| 2012/0229646 A1 * | 9/2012 | Grandidier et al. | 348/149 |
| 2013/0271553 A1 * | 10/2013 | Chu | 348/14.01 |

FOREIGN PATENT DOCUMENTS

| | | |
|---|---|---|
| GB | 2470754 | 12/2010 |
| JP | 2009-075926 | 4/2009 |
| JP | 2009-218719 | 9/2009 |
| JP | 2010-034652 | 2/2010 |
| KR | 10-2011-0090623 | 8/2011 |
| WO | WO-2006/097722 | 9/2006 |
| WO | WO-2011/048773 | 4/2011 |

OTHER PUBLICATIONS

European Search Report for EP Counterpart Application No. 11872942.5, 7 pgs., (Apr. 10, 2015).

* cited by examiner

MECHANISM FOR FACILITATING ENHANCED VIEWING PERSPECTIVE OF VIDEO IMAGES AT COMPUTING DEVICES

CROSS-REFERENCE TO RELATED APPLICATION

This patent application is a U.S. National Phase Application under 35 U.S.C. §371 of International Application No. PCT/US2011/054401, filed Sep. 30, 2011, entitled MECHANISM FOR FACILITATING ENHANCED VIEWING PERSPECTIVE OF VIDEO IMAGES AT COMPUTING DEVICES.

FIELD

The field relates generally to computing devices and, more particularly, to employing a mechanism for facilitating enhanced viewing perspective of video images at computing devices.

BACKGROUND

With the employment of cameras in all sorts of computing devices (e.g., mobile computing devices, such as smartphones, tablet computers, personal digital assistants (PDAs), etc.) and the rise in the use of these cameras by various communication software applications (e.g., Skype®, Tango®, FaceTime®, etc.) that provide video-based communication services, it is become increasingly important to provide a real-life communication experience to users. Current communication techniques are relatively static in nature and lack real-life communication experience.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the invention provide a mechanism for facilitating enhanced viewer perception of video images at computing devices according to one embodiment of the invention. A method of embodiments of the invention includes tracking, at a first computing device, movements associated with a first user within a camera range of one or more cameras coupled to the first computing device. Each movement of the first user may trigger an updated view of contents being displayed in real-time on the first computing device. The method may further include calculating a synthesized updated view of the contents in response to tracking a movement of the first user from a first position to a second position. The synthesized updated view may represent a realistic view of the contents in response to the movement of the first user from the first position to the second position. The method may further include displaying the synthesized updated view of the contents.

In one embodiment, view synthesis can be performed entirely on a single machine, such as the first or primary computing device as referenced in this document. For example and in one embodiment, if the primary computing device has enough source information (that may include or be due to certain relevant data received from one or more secondary computing devices), the entire process of view synthesis and other relevant computations may be performed at the primary computing device. Facilitating view synthesis on a single computing device may lead to reduced latency when changes are detected, and allow a person who purchases a better equipment of view synthesis to directly benefit from that compute instead of benefitting other participants.

Figure 1:
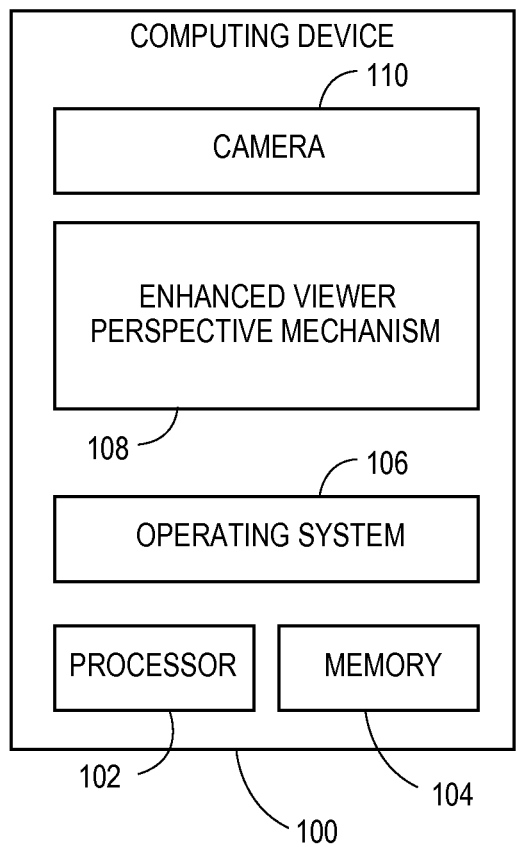
FIG. 1 illustrates a computing device employing an enhanced viewer perception mechanism for facilitating enhanced viewing perspective of video images according to one embodiment of the invention.

FIG. 1 illustrates a computing device employing an enhanced viewer perception mechanism for facilitating enhanced viewing perspective of video images according to one embodiment of the invention. In one embodiment, a computing device 100 is illustrated as having an enhanced viewer perspective ("EVP") mechanism 108 (herein referred to as "EVP mechanism", "perspective mechanism", or simply "mechanism") to employ and facilitate a thumb sensor. Computing device 100 may include a mobile computing device, such as smartphones (e.g., iPhone®, BlackBerry®, etc.), handheld computing devices, PDAs, etc., tablet computers (e.g., iPad®, Samsung® Galaxy Tab®, etc.), laptop computers (e.g., notebooks, netbooks, etc.), e-readers (e.g., Kindle®, Nook®, etc.), etc. Computing device 100 may further include larger computers, such as desktop computers, server computers, etc.

Computing device 100 includes an operating system 106 serving as an interface between any hardware or physical resources of the computer device 100 and a user. Computing device 100 further includes one or more processors 102, memory devices 104, network devices, drivers, or the like. It is to be noted that terms like "machine", "device", "computing device", "computer", "computing system", and the like, are used interchangeably and synonymously throughout this document.

In one embodiment, computing device 100 further includes one or more cameras 110 that are used to capture static and/or mobile views that may then be provided and displayed with enhanced viewing perspective using the EVP mechanism 108. Further, views may be synthesized temporarily or permanently, and such synthesized views may be obtained from a single or multiple camera feeds as well using other techniques, such as caching, inpainting, modeling, or the like. This will be further described with reference to FIG. 3.

Figure 2:
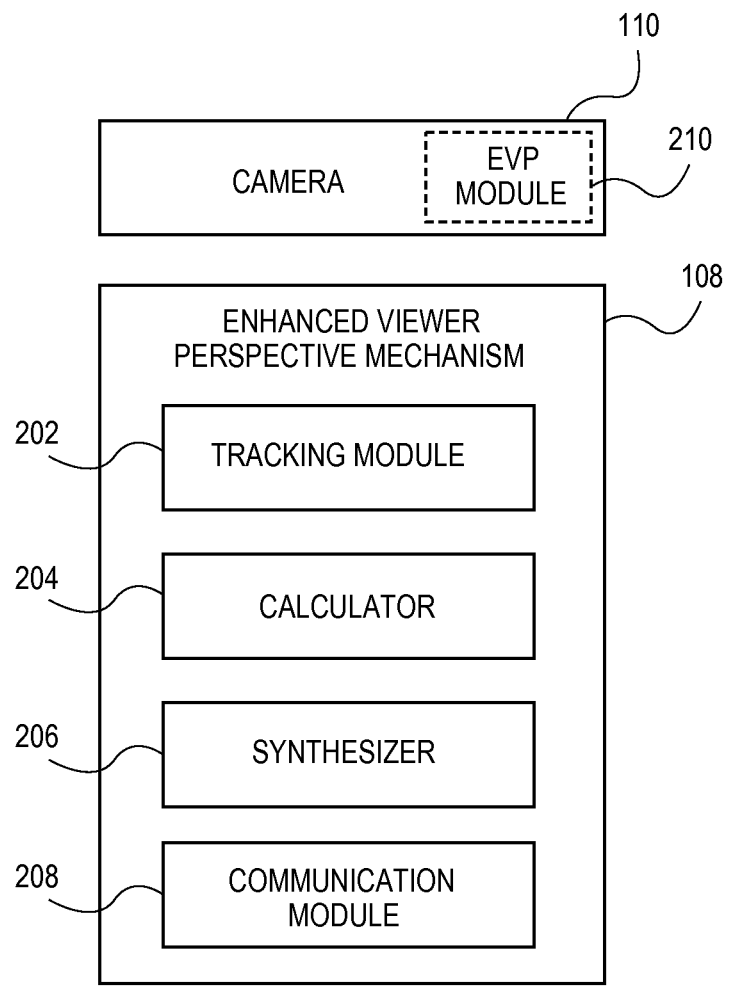
FIG. 2 illustrates an enhanced viewer perspective mechanism employed at a computing device according to one embodiment of the invention.

FIG. 2 illustrates an enhanced viewer perspective mechanism employed at a computing device according to one embodiment of the invention. In one embodiment, EVP mechanism 108 includes various components 202-208 to facilitate an enhanced perspective of views captured by a camera 110 at a computing device (e.g., a mobile computing device) to provide a more immersive and natural communication experience (e.g., video calling experience) by replicating a real-life participant/user experience through a portal/window of the corresponding computing device.

In one embodiment, EVP mechanism 108 includes a tracking module 202 to track the user (e.g., tracking the user's face, eyes, nose, forehead, etc., or any other features or parts of the user, any other objects or items, or the like) being captured by the camera 110. For brevity, simplicity, clarity and ease of understanding, in this document, face tracking is used as an example, but it is contemplated that embodiments of the present invention are not limited to face tracking. Face tracking may be performed by the tracking module 202 using one or more of existing face tracking techniques, such as faceAPI by Seeing Machines, etc. Once the face is tracked by the tracking module 202, a calculator 204 of the EVP mechanism 108 performs various calculations of the tracked position of the user (e.g., tracked position of the user's face). These calculations may include calculating various angles of the views (e.g., various positions and locations of the user's face), the field of view (also referred to as "field of vision", "field of view" or simply "FOV"), etc. FOV refers to an angular (or areal or linear) extent or view of something that can be seen at any given moment. For example, humans and animals have different FOVs, depending on the placement of their eyes, such as from an almost 180-degree horizontal/100-degree vertical view for humans to a nearly-complete 360-degree view for some animals.

In one embodiment, these calculations are sent from the primary computing device (e.g., a viewing system, a source system, or a first computing device being used by a first user) to a secondary computing device (e.g., a second computing device being used by a second user) such that the first and second users are in communication with each other using their respective computing devices. It is contemplated that any number of computing device may participate in enhanced viewing perspective having employed at least some version of the EVP mechanism 108 illustrated here. A synthesizer 206, at the secondary participating computing system, synthesizes the views or images (such as from multiple camera) based on the calculations or calculated data and inpaints it (e.g., fills in any occlusions exposed through the new view synthesis) to create an illusion of a virtual portal/window. Image or view synthesis (e.g., human image or view synthesis) refers to a technique employed to make an image believable to provide a realistic rendition of humans, whether moving or remaining still. For example, synthesizing of a human image may be performed by sampling the image by means of a three-dimensional ("3D") sampling, etc., to create realistic 3D model of the image based on the samples and applying various data (e.g., statistical information) and approximations. Further, various algorithms may be used to simulate laws of physics and physiology to map and synthesize the image model and its appearance and movements accordingly.

This view synthesis is then communicated back to the primary computing system through a communication module 208 (e.g., receiving module, transmitting module, etc.) so that the primary computing device may use the view synthesis to display the adjusted view to the viewer/user using a display screen or device, or generate a new view based on the view synthesis and additional camera feeds received by and from the camera 110. In one embodiment, the camera 110 may include an EVP module 210 that works like a hook or portal into the EVP mechanism 108 to work and be compatible with its various components 202-208. In another embodiment, EVP module 210 may be regarded as optional as the EVP mechanism 108 may be made to work with conventional cameras without having any additions or alterations made to them.

In one embodiment, this technique of using the camera 110 with the EVP mechanism 108 uses the user head tracking (obtained through the tracking module 202) and view synthesis (obtained through the synthesizer 206) to create and provide to the user a virtual portal or window experience that is realistic and provides a feeling of two or more users being and communicating in-person with each other. This is different and novel from the conventional systems that only offer static views. For example, a first user sitting in front of a camera (e.g., camera 110) of a primary computing device moves his head to the right. In conventional system, a second user in front of a camera at a secondary computing device may see the first user move his head in a particular angle to the right, but the view of the second user that the first user sees does not change. In one embodiment, using the EVP mechanism 108, when the first user moves his head body or head in a particular angle to the right side, not only the second user can see the first user move, but also the first user can now see the second user from a different perspective, such as the first user (by virtue of moving or tilting to the right) can now see more of the left side of the second user's face and more of the wall behind the second user or perhaps more of a painting hanging on the wall to the right of the second user, or the like. Further and in one embodiment, the effect and processes discussed here are equally valid even if the user is extracted from the background and placed in either a synthetic background or no background at all.

In one embodiment, view synthesis can be performed entirely on a single machine, such as the first or primary computing device as referenced in this document. For example and in one embodiment, if the primary computing device has enough source information (that may include or be due to certain relevant data received from one or more secondary computing devices), the entire process of view synthesis and other relevant computations may be performed at the primary computing device.

For example, a first user at a first computing device may be in video communication with a second user at a second computing device. The first user's movement from a first position to a second position (e.g., tilting of the head or getting up from the chair, or exercising (e.g., running on treadmill, doing yoga, etc.)) may trigger the first computing device to determine a synthesize updated view of the content (e.g., the second user, her surroundings, her background, etc.) being displayed on the first computing device. In other words, each time the first user moves, he sees the content on his computing device from a different perspective as would be the case in reality, such as two individual having a conversation sitting at a table. In one embodiment, the first computing device calculates the synthesized updated view of the content for the first user using, for example, some of the data relating to the content (e.g., one or more measurements angles and/or view of the second user with respect to the first user) received, at some point in time, from the second computing device. In another embodiment, the first computing device requests the second computing device to calculate the synthesized updated view of the content, and receives the synthesized view from the second computing device. The synthesized updated view may refer to, for example, how the content, such as the second user, now appears to the first user based on the first user's movement from the first position to the second position; for example, if the first user stands up from the chair and is no longer on the eye-level with the second user, he may now, using the synthesized update view, be able to see the top of the head of the second user.

It is contemplated that any number and type of components may be added to and removed from the EVP mechanism 108 to facilitate the workings and operability of the EVP mechanism 108 in providing enhanced viewer perception of video images. For brevity, clarity, ease of understanding and to focus on the EVP mechanism 108, many of the default or known components of a computing device are not shown or discussed here.

Figure 3:
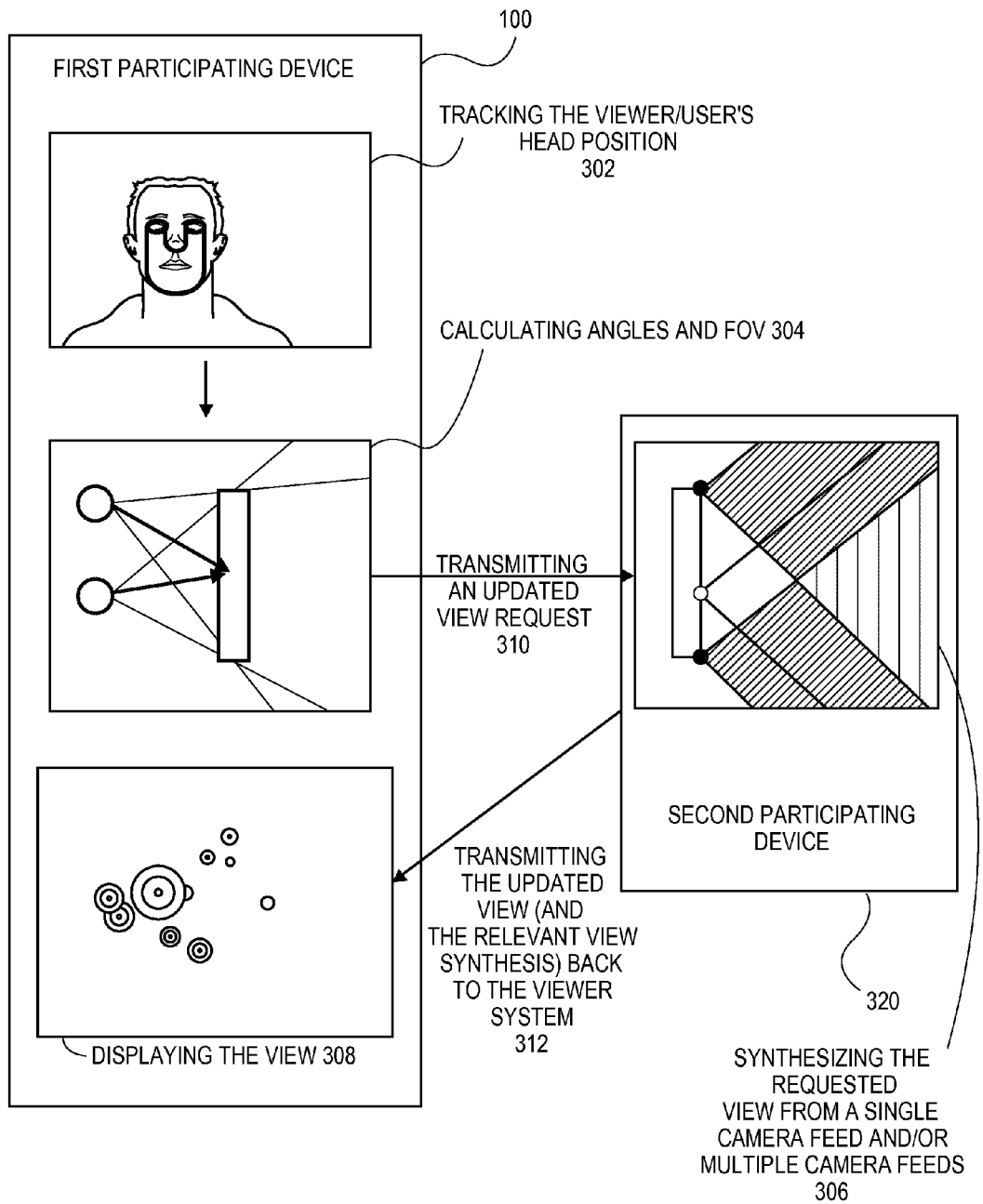
FIG. 3 illustrate a transactional sequence for facilitating enhanced viewer perception of video images at multiple participating computing systems according to one embodiment of the invention.

FIG. 3 illustrates a transactional sequence for facilitating enhanced viewer perception of video images at multiple participating computing systems according to one embodiment of the invention. In the illustrated embodiment, two computing systems are regarded as participating computing devices 100 and 320. For example, a first user uses the first participating device 100 (also referred to as the source or viewing system) to video call a second user who answers the video call using the second participating device 320. Once the connection has been established, the two users can now see each other using the cameras at or in connection with their corresponding systems A 100 and B 320. Now, let us suppose, when the first user at the first participating device 100 moves a bit (e.g., tilts the head to the right), the tracking module at the EVP mechanism at the first participating device 100 immediately tracks 302 the position of the first user's head that is not tilted to the right. This tracking information is then used by the EVP mechanism's calculator to calculate or determine 304 the necessary numbers (e.g., certain angles, FOV, etc.). These calculations along with a request for the updated view (given in light of the first user's now tilted head) are then sent or transmitted 310 to the second participating device 320.

The calculations and the request for the updated view are received at the second participating device 320. In response to the request for the updated view and based on the received calculations, a view synthesizing 306 is performed based on the received calculations and image of the first user (e.g., head tilted to the right) and the various corresponding images of the second user being observed by one or more cameras in communication with the second participating device 320. For example, view synthesis 306 helps generate a realistic image as to how would the second user seem to the first user if they two individuals were in-person and sitting across from each other and the first user had tilted his or her head to the right. In one embodiment, view synthesis 306 may be performed for the requested view from a single camera feed and/or multiple camera feeds. This view synthesis 306 is then transmitted back 312 to the first participating device 100. Using the received view synthesis 306, the view or image being displayed 308 on the display device or screen of the first participating device 100 is then adjusted accordingly. Again, continuing with the example of the first user tilting his head to the right, using the aforementioned view synthesis and the entire enhanced perspective process being performed by the EVP mechanism, the first user at the first participating device 100 can then view 308 a properly adjusted and realistic view or image of the far away and remote second user (as well as the second user's background, such as walls, windows, paintings, outside view, trees, etc.) being viewed through one or more cameras associated with the second participating device 320. Further and in one embodiment, the effect and processes discussed here are equally valid even if the user is extracted from the background and placed in either a synthetic background or no background at all. As aforementioned, each of the two participating devices 100, 320 may have employed all or some components of the EVP mechanism and other relevant hardware components (e.g., cameras) and software modules (e.g., face tracking techniques), etc., that may be facilitated to be used with the EVP mechanism.

As aforementioned with reference to FIG. 2, in one embodiment, view synthesis can be performed completely on a single machine, such as the first or primary computing device 100 as referenced here and throughout this document. For example and in one embodiment, if the primary computing device 100 has enough source information (that may include or be due to certain relevant data received from one or more secondary computing devices 320), the entire process of view synthesis and other relevant computations may be performed at the primary computing device 100.

Figure 4:
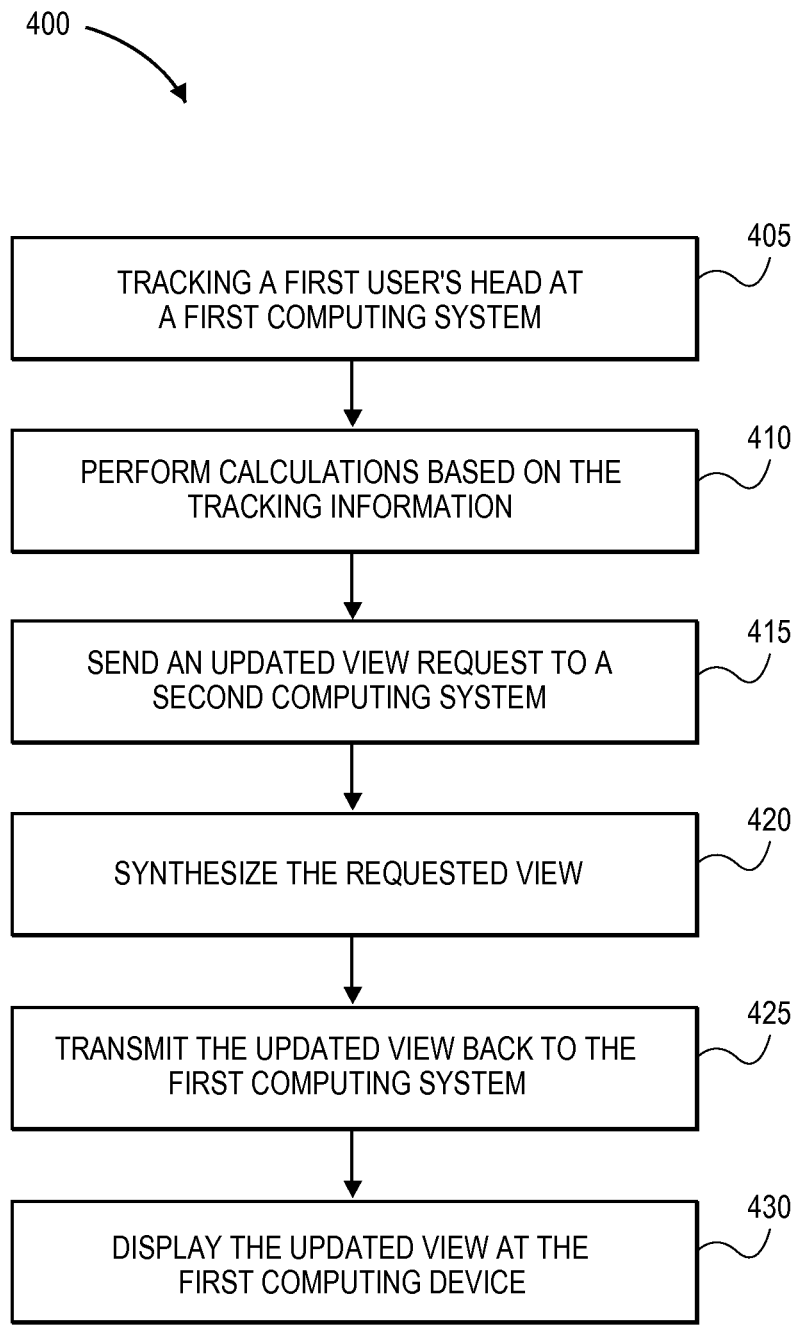
FIG. 4 illustrates a method for facilitating enhanced viewing perspective of video images using an enhanced viewer perspective mechanism according to one embodiment of the invention.

FIG. 4 illustrates a method for facilitating enhanced viewing perspective of video images using an enhanced viewer perspective mechanism according to one embodiment of the invention. Method 400 may be performed by processing logic that may comprise hardware (e.g., circuitry, dedicated logic, programmable logic, etc.), software (such as instructions run on a processing device), or a combination thereof. In one embodiment, method 400 may be performed by the enhanced viewer perspective mechanism of FIG. 1.

Method 400 starts at processing block 405 with tracking a first user's head at a first participating computing system. For example, one or more cameras at the first participating system capture images of the first user and then a head tracking technique employed at the first participating system begins tracking the first user's head based on the captured images of the first user. At block 410, once some data relating to the movement of the first user's head has been obtained, a number of calculations relating to various angles and FOVs of the captured images are performed using the head tracking data obtained from and by the head tracking technique.

At block 415, based on the calculations, an updated-view request is formed and transmitted on to a second participating computing system that is being used by a second user in communication with the first user over a network. For example, the two users may be in communication over a video call using a telephone or communication software application, such as Skype or FaceTime, etc. The updated-view request and the calculations are communicated on to the second participating computing system. At block 420, in response to the updated-view request and using the received calculations, the second participating system forms view synthesis of the images or views of the second user captured by one or more cameras associated with the second participating system. The view synthesis is then transmitted on to the first participating system at block 425. At block 430, the view synthesis is used by the first participating system to facilitate a realistic view on the second user and other relevant objects (e.g., trees, walls, humans, pets, etc.) near, behind or surrounding the second user at the display device associated with the first participating system.

As aforementioned with reference to FIGS. 1-2, in one embodiment, view synthesis can be performed completely on a single machine, such as the first or primary participating computing device as referenced here and throughout this document. For example and in one embodiment, if the first participating computing device has enough source information (that may include or be due to certain relevant data received from one or more second or secondary participating computing devices), the entire process of calculating view synthesis and other relevant computations may be performed at the first participating computing device.

Figure 5:
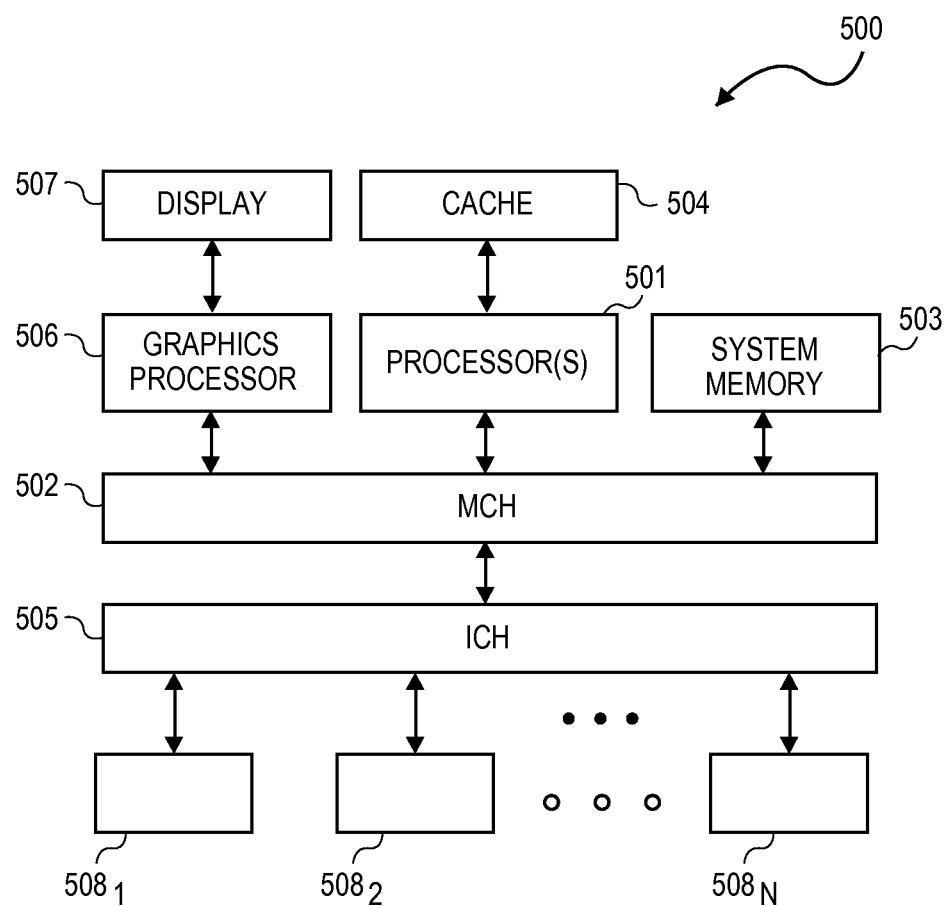
FIG. 5 illustrates a computing system according to one embodiment of the invention.

FIG. 5 illustrates a computing system 500 employing and facilitating an enhanced viewer participating mechanism as referenced throughout this document according to one embodiment of the invention. The exemplary computing system 500 may be the same as or similar to the computing systems 100 and 320 of FIGS. 1 and 3, respectively, and include: 1) one or more processors 501 at least one of which may include features described above; 2) a memory control hub (MCH) 502; 3) a system memory 503 (of which different types exist such as double data rate RAM (DDR RAM), extended data output RAM (EDO RAM) etc.); 4) a cache 504; 5) an input/output (I/O) control hub (ICH) 505; 6) a graphics processor 506; 7) a display/screen 507 (of which different types exist such as Cathode Ray Tube (CRT), Thin Film Transistor (TFT), Light Emitting Diode (LED), Molecular Organic LED (MOLED), Liquid Crystal Display (LCD), Digital Light Projector (DLP), etc.; and 8) one or more I/O devices 508.

The one or more processors 501 execute instructions in order to perform whatever software routines the computing system implements. The instructions frequently involve some sort of operation performed upon data. Both data and instructions are stored in system memory 503 and cache 504. Cache 504 is typically designed to have shorter latency times than system memory 503. For example, cache 504 might be integrated onto the same silicon chip(s) as the processor(s) and/or constructed with faster static RAM (SRAM) cells whilst system memory 503 might be constructed with slower dynamic RAM (DRAM) cells. By tending to store more frequently used instructions and data in the cache 504 as opposed to the system memory 503, the overall performance efficiency of the computing system improves.

System memory 503 is deliberately made available to other components within the computing system. For example, the data received from various interfaces to the computing system (e.g., keyboard and mouse, printer port, Local Area Network (LAN) port, modem port, etc.) or retrieved from an internal storage element of the computer system (e.g., hard disk drive) are often temporarily queued into system memory 503 prior to their being operated upon by the one or more processor(s) 501 in the implementation of a software program. Similarly, data that a software program determines should be sent from the computing system to an outside entity through one of the computing system interfaces, or stored into an internal storage element, is often temporarily queued in system memory 503 prior to its being transmitted or stored.

The ICH 505 is responsible for ensuring that such data is properly passed between the system memory 503 and its appropriate corresponding computing system interface (and internal storage device if the computing system is so designed). The MCH 502 is responsible for managing the various contending requests for system memory 503 accesses amongst the processor(s) 501, interfaces and internal storage elements that may proximately arise in time with respect to one another. In one embodiment, the MCH 502 and ICH 505 may not be separately employed; but rather, be provided as part of a chipset that includes the MCH 502, ICH 505, other controller hubs, and the like.

One or more I/O devices 508 are also implemented in a typical computing system. I/O devices generally are responsible for transferring data to and/or from the computing system (e.g., a networking adapter); or, for large scale non-volatile storage within the computing system (e.g., hard disk drive). ICH 505 has bi-directional point-to-point links between itself and the observed I/O devices 508.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

I claim:

1. A computer-implemented method comprising:
    tracking, at a first computing device, movements associated with a first user within a camera range of one or more cameras coupled to the first computing device, wherein the movements trigger and correspond to updated views of contents relating to the first user being displayed in real-time on the first computing device;
    calculating synthesis data based on the updated views as triggered by the movements associated with the first user;
    synthesizing the updated views into a synthesized view based on the calculated synthesis data, wherein the synthesized view represents a realistic view of the movements of the first user, wherein synthesizing further includes filling one or more occlusions exposed through the updated views and generating an illusion of a virtual portal; and
    displaying the synthesized view of the first user, wherein displaying includes realistic rendering, in real-time and via the virtual portal, of the realistic view of the first user.

2. The computer-implemented method of claim 1, wherein the updated views include three-dimensional sampling of the movements, wherein the first user and a second user are in video communication via the first computing device and a second computing device, respectively.

3. The computer-implemented method of claim 1, wherein tracking movements comprises tracking one or more of the first user's face, the first user's eyes, the first user's nose, and the first user's forehead.

4. The computer-implemented method of claim 1, wherein the synthesis data comprises one or more measurements relating to changing angles or fields of views to the contents with respect to one or more positions of the first user.

5. The computer-implemented method of claim 1, further comprising requesting the second computing device to calculate the synthesis data, and receiving the synthesis data from the second computing device.

6. The computer-implemented method of claim 4, wherein the first and second computing devices comprise one or more of smartphones, personal digital assistants (PDAs), handheld computers, e-readers, tablet computers, and desktop computers.

7. A non-transitory machine-readable medium comprising instructions that, when executed by a machine, cause the machine to:
   track, at the first computing device, movements associated with a first user within a camera range of one or more cameras coupled to the first computing device, wherein the movements trigger and correspond to updated views of contents relating to the first user being displayed in real-time on the first computing device;
   calculate synthesis data based on the updated views as triggered by the movements associated with the first user;
   synthesize the updated views into a synthesized view based on the calculated synthesis data, wherein the synthesized view represents a realistic view of the contents in response to the movements of the first user, wherein synthesizing further includes filling one or more occlusions exposed through the updated views and generating an illusion of a virtual portal; and
   display the synthesized view of the first user, wherein displaying includes realistic rendering, in real-time and via the virtual portal, of the realistic view of the first user.

8. The non-transitory machine-readable medium of claim 7, wherein the updated views include three-dimensional sampling of the movements, wherein the first user and a second user are in video communication via the first device and a second computing device, respectively.

9. The non-transitory machine-readable medium of claim 7, wherein tracking movements comprises tracking one or more of the first user's face, the first user's eyes, the first user's nose, and the first user's forehead.

10. The non-transitory machine-readable medium of claim 7, wherein the synthesis data comprises one or more measurements relating to changing angles or fields of views to the contents with respect to one or more positions of the first user.

11. The non-transitory machine-readable medium of claim 7, wherein the machine is further to request the second computing device to calculate the synthesis data, and receiving the synthesis data from the second computing device.

12. An apparatus comprising:
   a tracking module to track, at the first computing device, movements associated with a first user within a camera range of one or more cameras coupled to the first computing device, wherein the movements trigger and correspond to updated views of contents relating to the first user being displayed in real-time on the first computing device;
   a calculator to calculate synthesis data based on the updated views as triggered by the movements associated with the first user;
   a synthesizer to synthesize the updated views into a synthesized view based on the calculated synthesis data, wherein the synthesized view represents a realistic view of the contents in response to the movements of the first user, wherein synthesizing further includes filling one or more occlusions exposed through the updated views and generating an illusion of a virtual portal; and
   a communication module to display the synthesized view of the first user, wherein displaying includes realistic rendering, in real-time and via the virtual portal, of the realistic view of the first user.

13. The apparatus of claim 12, wherein the updated views include three-dimensional sampling of the movements, wherein the first user and a second user are in video communication via the first device and a second computing device, respectively.

14. The apparatus of claim 12, wherein tracking movements comprises tracking one or more of the first user's face, the first user's eyes, the first user's nose, and the first user's forehead.

15. The apparatus of claim 12, wherein the synthesis data comprises one or more measurements relating to changing angles or fields of views to the contents with respect to one or more positions of the first user.

16. The apparatus of claim 12, wherein the machine is further to request the second computing device to calculate the synthesis data, and receiving the synthesis data from the second computing device.

\* \* \* \* \*